US011482056B2

(12) United States Patent
Bates et al.

(10) Patent No.: US 11,482,056 B2
(45) Date of Patent: Oct. 25, 2022

(54) OPERATIONS MANAGEMENT SYSTEM FOR COMMERCIAL PASSENGER VEHICLES

(71) Applicant: Panasonic Avionics Corporation, Lake Forest, CA (US)

(72) Inventors: Steven Bates, Mission Viejo, CA (US); Philip Watson, Lake Forest, CA (US); Samir Lad, Dublin, CA (US); Anand Desikan, San Ramon, CA (US)

(73) Assignee: PANASONIC AVIONICS CORPORATION, Irvine, CA (US)

( * ) Notice: Subject to any disclaimer, the term of this patent is extended or adjusted under 35 U.S.C. 154(b) by 482 days.

(21) Appl. No.: 16/565,313

(22) Filed: Sep. 9, 2019

(65) Prior Publication Data

US 2021/0074082 A1    Mar. 11, 2021

(51) Int. Cl.
*G07C 5/00* (2006.01)
*G06N 5/04* (2006.01)
*G07C 5/08* (2006.01)
*B64D 45/00* (2006.01)
*B64F 5/60* (2017.01)

(52) U.S. Cl.
CPC ............ *G07C 5/008* (2013.01); *B64D 45/00* (2013.01); *B64F 5/60* (2017.01); *G06N 5/04* (2013.01); *G07C 5/006* (2013.01); *G07C 5/0825* (2013.01); *B64D 2045/0085* (2013.01)

(58) Field of Classification Search
CPC ...... G07C 5/008; G07C 5/006; G07C 5/0825; B64F 5/60; B64D 45/00; B64D 2045/0085; G06N 5/04

USPC ...................................................... 701/29.4
See application file for complete search history.

(56) References Cited

U.S. PATENT DOCUMENTS

| | | | |
|---|---|---|---|
| 2002/0143421 A1* | 10/2002 | Wetzer | G06Q 10/06314 700/100 |
| 2010/0042283 A1 | 2/2010 | Kell et al. | |
| 2015/0324501 A1 | 11/2015 | Desell et al. | |
| 2017/0236075 A1 | 8/2017 | Shi | |
| 2017/0291715 A1 | 10/2017 | Jayathirtha et al. | |
| 2019/0087789 A1* | 3/2019 | Barkat | G07C 5/008 |
| 2019/0102957 A1 | 4/2019 | Huber et al. | |

(Continued)

FOREIGN PATENT DOCUMENTS

CN            105512483         4/2018

*Primary Examiner* — Maceeh Anwari
(74) *Attorney, Agent, or Firm* — Perkins Coie LLP (57) ABSTRACT

Vehicle operations management systems can facilitate maintenance of commercial passenger vehicles. An operations management system includes a server and a maintenance computer. The server is configured to receive a message that indicates a maintenance performed on a device located in a commercial passenger vehicle or that indicates a performance status of the device located in the commercial passenger vehicle, generate, based on the message, a predictive maintenance list that recommends maintenance to be performed on one or more devices that belong to a category of devices that is the same as the category of devices to which the device indicated in the received message belongs, and send the predictive maintenance list to a maintenance computer. The maintenance computer is configured to receive and display the predictive maintenance list on a graphical user interface (GUI).

20 Claims, 6 Drawing Sheets

(56) References Cited

U.S. PATENT DOCUMENTS

2019/0213803 A1* 7/2019 Ye .......................... G06Q 10/20
2019/0304212 A1* 10/2019 Bailey .................. G07C 5/0825

* cited by examiner

OPERATIONS MANAGEMENT SYSTEM FOR COMMERCIAL PASSENGER VEHICLES

TECHNICAL FIELD

This document is directed generally to systems, methods, and apparatus to obtain and use predictive maintenance lists to maintain commercial passenger vehicles.

BACKGROUND

Commercial passenger vehicles have evolved to serve the growing needs of passengers. For example, passengers can travel long distances on an airplane equipped with entertainment systems, dining options, and adjustable seating to provide passengers with a positive travel experience. However, the devices located in or on the commercial passenger vehicles can be subject to wear-and-tear when used. When a device in a commercial passenger vehicle malfunction, a maintenance personnel is instructed to replace the malfunctioned device.

SUMMARY

This patent document describes exemplary systems, methods, and apparatus to obtain and use predictive maintenance lists to maintain commercial passenger vehicles. The predictive maintenance list can be obtained based on past maintenance requests of one or more commercial passenger vehicles, performance indicators of devices in one or more commercial passenger vehicles, and/or other available collected or stored information about maintenance performed on devices in one or more commercial passenger vehicles.

An exemplary system is described for recommending maintenance of devices in commercial passenger vehicles. The exemplary system comprises a server comprising a processor configured to: receive a message that indicates a maintenance performed on a device located in a commercial passenger vehicle or that indicates a performance status of the device located in the commercial passenger vehicle; generate, based on the message, a predictive maintenance list that recommends maintenance to be performed on one or more devices that belong to a category of devices that is the same as the category of devices to which the device indicated in the received message belongs, where the predictive maintenance list includes a first set of identifiers that identify the one or more devices and a second set of identifiers that identify the one or more commercial passenger vehicles on which the one or more devices are located; and send the predictive maintenance list to a maintenance computer. The exemplary system also includes the maintenance computer comprising a processor configured to receive and display the predictive maintenance list on a graphical user interface (GUI).

An exemplary method is described for recommending maintenance of devices in commercial passenger vehicles comprises receiving a message that indicates a maintenance performed on a device located in a commercial passenger vehicle or that indicates a performance status of the device located in the commercial passenger vehicle; generating, based on the message, a predictive maintenance list that recommends maintenance to be performed on one or more devices that belong to a category of devices that is the same as the category of devices to which the device indicated in the received message belongs, where the predictive maintenance list includes a first set of identifiers that identify the one or more devices and a second set of identifiers that identify the one or more commercial passenger vehicles on which the one or more devices are located; and sending the predictive maintenance list to a maintenance computer In yet another exemplary aspect, the above-described methods are embodied in the form of processor-executable code and stored in a non-transitory computer-readable program medium. The code included in the computer readable storage medium when executed by a processor, causes the processor to implement the methods described in this patent document.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Operational efficiency is important to maintain profitability when operating one or more vehicle systems located in a commercial passenger vehicle. All vehicular systems require some sort of maintenance, e.g., from major overall to general cleaning, at scheduled times to keep these systems in good working condition. One such system is a vehicle entertainment system that sends entertainment content (e.g., audio, movies, televisions shows, or other videos) to video screens (e.g., seatback monitors, Personal Electronic Devices (PEDs), or other mobile electronic devices). Seatback monitors utilize a custom core software program and one or more software programs when displaying graphical on a display screen and outputting sound to one or more output ports, e.g., headphone jack(s). On the other hand, local Wi-Fi network channels can broadcast movies, televisions shows, and the like to PEDs, laptops, or other mobile devices in the vehicle. Devices related to the vehicle entertainment system can malfunction, and thus, need to be replaced.

In conventional operations management system, a maintenance personnel either is instructed to replace a device in a commercial passenger vehicle when that device has malfunctioned or is instructed to replace devices in the commercial passenger vehicle according to a schedule (e.g., replace seatback monitors every 12 months). However, in such a system, devices in a commercial passenger vehicle may only be replaced when that device stops working or according to a schedule even when the devices have not malfunctioned. Furthermore, in a schedule-based device management, the conventional operations management system may simply recommend replacement of device based on passage of time rather than basing its decision to replace a device based on an analysis of data (e.g., fault message) that indicates how well the device is operating. Thus, conventional operations management systems tend to be either reactive or wasteful when replacing devices in a commercial passenger vehicle. One of the technical drawbacks with conventional operations management system is that it does not analyze data related to how well devices are operating on one or more commercial passenger vehicles. This patent document describes exemplary operations management related systems, apparatus and methods to overcome at least the above described technical drawbacks with conventional operations management systems.

Figure 1:
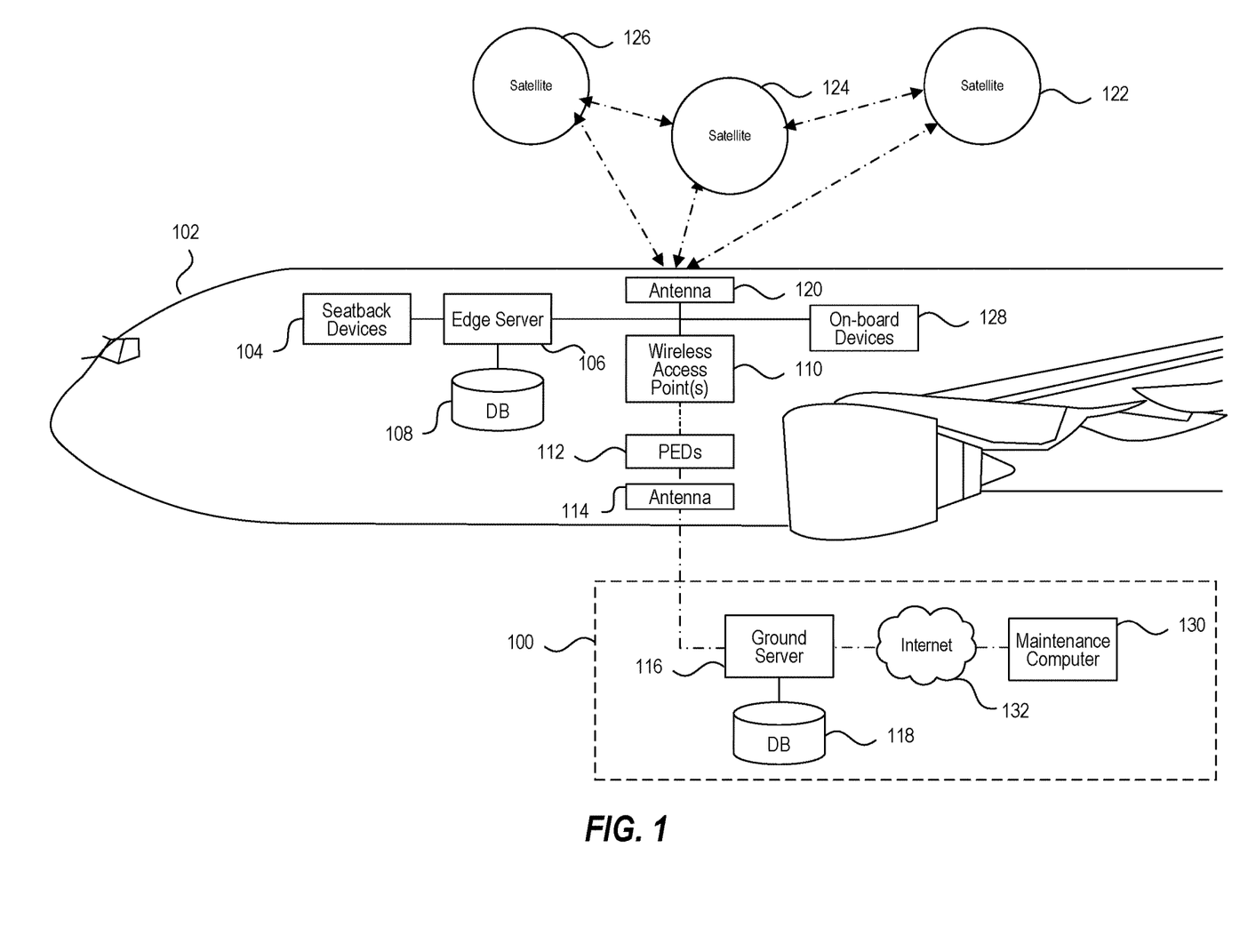
FIG. 1 shows an exemplary operations management system in the context of a vehicle entertainment system installed in an airplane.

FIG. 1 shows an exemplary operations management system 100 in the context of a vehicle entertainment system installed in an airplane 102. The operations management system includes a ground server 116 that is in communication with the edge server 106 of the airplane 102. The ground server 116 can also send messages to and receive messages from the maintenance computer 130 (e.g., desktop or mobile device) via the Internet 132. The ground server 116 includes or is associated with a database 118 on which the ground server 116 stores various lists to provide a predictive maintenance list to the maintenance computer 130 to enable maintenance personnel or third-party personnel to repair or replace faulty or malfunctioning parts or devices on the airplane 102. The maintenance computer 130 can be located at various airports around the world to enable the ground server 106 to send maintenance related information to maintenance personnel anywhere commercial passenger vehicles can be driven to or flown to.

The airplane 102 includes an edge server 106 (or head-end server). The edge server 106 is communicably coupled to the seatback devices 104 and PEDs 112 to provide multimedia contents (e.g., audio, video, image, webpage, etc.) to the seatback devices 104 and/or PEDs. For example, the edge server 106 may send multimedia contents to seatback devices 104 via an Ethernet switch, and the edge server 106 module may send multimedia contents to PEDs 112 via one or more wireless access points 110. The edge server 106 can send a list of multimedia contents to be displayed on a graphical user interface (GUI) of the seatback devices 104 and/or the PEDs 112.

After a user selects a particular multimedia content via a seatback device or a PED, the seatback device or PED can send the user's selection information to the edge server 106, whereupon the edge server 106 can send the selected multimedia content back to the user's seatback device or PED. A seatback device and/or a PED can be considered a media playback device at least because the seatback device or a PED can display or play the multimedia content. The seatback devices 104 and PEDs 112 can include appropriate audio or video codecs stored thereon to play the multimedia contents provided by the edge server 102 or another device (e.g., media hard drive) located onboard the airplane 102.

The PEDs 112 can wirelessly communicate with one or more wireless access points 110. Thus, the PEDs 112 can be in communication with the ground server 116 or another server via the wireless access point(s) 110 and the antenna 114. This connection can enable the PEDs to access the Internet even when the airplane 102 is flying and the PEDs do not have cellular connectivity.

The edge server 106 can also be communicably coupled to on-board devices 128 located in the airplane 102 so that the edge server 106 can or store in its database 108 a log of error or fault messages generated by the on-board devices 128. For example, the edge server 106 can receive an error message from an air-conditioning unit in the airplane 102 that indicates that a refrigerant in the air-conditioning unit is below a threshold value. In another example, the edge server 102 can receive a fault message from a seatback device 104 that can indicate that the seatback device restarted twice due to an error condition in the seatback device. In yet another example, the edge server 102 can receive a message from a food warming device (e.g., oven) that it has malfunctioned and turned off. The edge server 106 can transmit to a ground server 116 the stored database of error or fault message, so that the ground server 116 can perform additional analysis as described in this patent document.

The example headings for the various sections below are used to facilitate the understanding of the disclosed subject matter and do not limit the scope of the claimed subject matter in any way. Accordingly, one or more features of one example section can be combined with one or more features of another example section.

A. Generating and Using Predictive Maintenance List

In FIG. 1, the edge server 106 is in communication with a ground server 116 located a on the ground via an antenna 114. The ground server 116 is not located within any commercial passenger vehicle, and is a fixed location server, e.g., a ground-based server, and is configured to provide predictive maintenance list for one or more commercial passenger vehicle. The ground server 116 can advantageously obtain from the edge server 106 the log of error or fault messages generated by the devices in the airplane 102. In some embodiments, the log of error or fault message may include a table that includes identifier(s) of the device(s) that generated error or fault messages and a corresponding text associated with the error or fault message that indicate the type of error or fault experienced by the devices (e.g., "over-temperature" or "restarted" or "low coolant"). For example, when the airplane 102 has landed at its destination, the edge server 106 can send to the ground server the log of error and fault messages. The ground server 116 can gather log of error and fault messages from additional commercial passenger vehicle so that the ground server 116 can generate predictive maintenance lists to recommend to a maintenance personnel the type of maintenance to be performed on devices located in the airplane 102 and in other commercial passenger vehicles.

The ground server 116 may include a predictive maintenance module (shown as 325 in FIG. 3A) that can receive and store the log of error or fault messages from one or more commercial passenger vehicles in a database 118. The database 118 can be stored in the ground server 116. In some embodiments, the edge server 106 can be in communication with a ground server 116 through satellites 122, 124, and 126 (for example, when at high altitude, flying over a body of water, or area where there is limited signaling from the ground) via an antenna 120.

The ground server 116 can implemented vehicle operational efficiency based on the predictive maintenance list that can be generated based on past maintenance requests of one or more commercial passenger vehicles, performance indicators (e.g., log of error or fault messages) of devices in one or more commercial passenger vehicles, and/or other available collected or stored information about maintenance performed on devices in one or more commercial passenger vehicles.

i. Maintenance Based on Past Maintenance Requests

Figure 2:
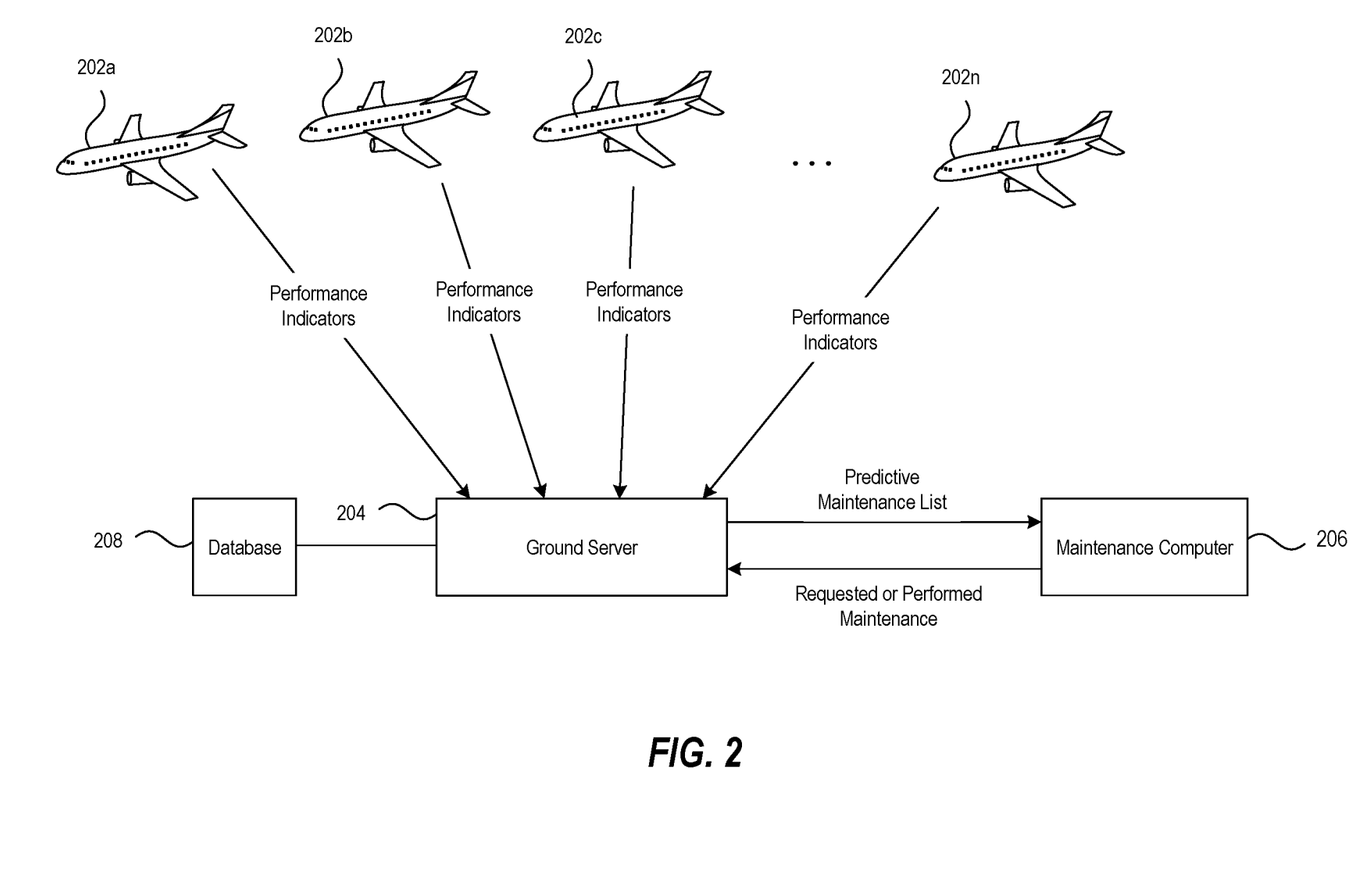
FIG. 2 shows a block diagram of an exemplary operations management system for determining predictive maintenance list.

FIG. 2 shows a block diagram of an exemplary operations management system for determining predictive maintenance list. The ground server 204 can store in its database 208 a first list of past maintenance requested on devices in commercial passenger vehicles. The first list may include the device identifier and the type of maintenance performed. As shown in FIG. 2, the content in the list of past maintenance can be obtained from the maintenance computer 206, where the maintenance computer 206 can send to the ground server 206 a message that includes an identification of device (e.g., part number) that was repaired or replaced, an identification of the commercial passenger vehicle on which the repaired/replaced device was located (e.g., unique aircraft number), and the type of maintenance performed (e.g., repair cable or replace coolant).

The ground server 204 can also store in its database 208 a second list that includes commercial passenger vehicles identifiers and, for each commercial passenger vehicle, devices that are currently operating within a commercial passenger vehicle. The predictive maintenance module of the ground server 204 can analyze the first list to determine whether one or more devices from the second list should be replaced. For example, the predictive maintenance module can analyze the first list to determine that a mean time between failure (MTBF) for a seatback monitor (104 in FIG. 1) is 16 months. Based on such information, the predictive maintenance module can determine and generate, from the second list, a predictive maintenance list that comprises an identification of one or more seatback monitors (e.g., device part numbers or serial numbers) that need to be replaced (e.g., operating for 14 months) and identification of commercial passenger vehicles (e.g., unique flight numbers in a fleet) on which the one or more devices are located. Thus, the predictive maintenance module can determine one or more devices from the second list that belong to a category of devices (e.g., seatback monitors) that is the same as the category of devices to which the device in the first list belongs.

For devices that the ground server 204 identifies as needing replacement based on past maintenance requests, the predictive maintenance module can send a message to a maintenance computer 206 (e.g., desktop or mobile device) to replace devices that are expected to fail in the commercial passenger vehicle. As shown in FIG. 2, the message sent by the ground server 204 to the maintenance computer 206 can include a predictive maintenance list of one or more devices that are being recommended to be replaced. In some embodiments, the ground server 204 can send the message to a maintenance computer 206 when the predictive maintenance module determines that a device in the second list are operating within a pre-determined time window (e.g., 3 months in the above example) from a time associated with the MTBF for the device.

The maintenance computer 206 can include a device maintenance module (375 in FIG. 3B) that can receive the message and display the predictive maintenance list of one or more devices on a graphical user interface (GUI) on a display associated with the maintenance computer 206. The device maintenance module of predictive maintenance computer 206 can allow a maintenance personal or third-party personnel to request the purchase of or obtain one or more devices to be replaced in the commercial passenger vehicle.

When the maintenance personal or the third-party personnel obtains and replaces the one or more devices in the commercial passenger vehicle, the maintenance personal or the third-party personnel can indicate via the GUI of the maintenance computer 206 that the one or more devices have been replaced. The device maintenance module of the maintenance computer 206 can generate and send a maintenance record of the replaced devices located in the commercial passenger vehicle to the ground server 204 that can update its second list. The maintenance record may include an identifier (e.g., serial number or part number) of the one or more devices newly installed in the commercial passenger vehicle and the date when the installation was performed so that the ground server 204 can continue to analyze the first list of devices to recommend devices from the second list that should be replaced.

The techniques described in Section A.(i) for replacing devices can be also applied to repairing devices. For example, the first list can indicate that an oven is repaired within 6 months of installation to fix a heating element. Based on the first list, the predictive maintenance module can send a message to the maintenance computer 206 that indicates that a same oven located in a commercial passenger vehicle and operating for 4 months needs to be repaired. The maintenance record sent by the maintenance computer 206 to the ground server 204 can include identifiers of one or more devices that were repaired.

ii. Maintenance Based on Performance Indicators

FIG. 2 shows that a ground server 204 can receive a list of performance indicators (e.g., log of error or fault messages) from commercial passenger vehicles 202a-202n. The ground server 204 can store in its database 208 a first list of performance indicators (e.g., log of error or fault messages) of devices in the commercial passenger vehicles 202a-202n. The first list may include the device identifier and the type of error or fault message.

The ground server 204 can also store in its database 208 a second list that includes commercial passenger vehicles identifiers and, for each commercial passenger vehicle, devices that are currently operating within a commercial passenger vehicle. The predictive maintenance module of the ground server 204 can analyze the first list to determine whether one or more devices from the second list vehicle should be repaired or replaced. For example, the predictive maintenance module can analyze the first list to determine that a device generates an error message from a loose electrical cable within first six months of its usage. Based on such information, the predictive maintenance module can determine and generate, from the second list, a predictive maintenance list that comprises an identification of one or more devices (e.g., device part numbers or serial numbers) that have been operating for less than six months and whose electrical cables need to be repaired or replaced, and the predictive maintenance list includes identification of commercial passenger vehicles (e.g., unique flight numbers in a fleet) on which the one or more devices are located. The one or more devices in the predictive maintenance list can be the same as the device from the first list that generates an error message from a loose electrical cable within first six months of its usage. Thus, the predictive maintenance module can determine one or more devices from the second list that belong to a category of devices (e.g., electrical cables of a device) that is the same as the category of devices to which the device in the first list belongs.

For devices that the ground server 204 identifies as needing replacement or repair based on performance indicators, the predictive maintenance module can generate and send a message to a maintenance computer 206 to replace or repair devices that are expected to generate the error or fault message in the commercial passenger vehicle. In some embodiments, the message sent by the ground server 204 to the maintenance computer 206 can include a predictive maintenance list of one or more devices that are being recommended to be replaced or repaired. In some embodiments, the ground server 204 can send the message to a maintenance computer 206 when the predictive maintenance module determines that a device in the second list are operating within a pre-determined time window (e.g., 3 months in the above example) of a time when the device generates the error or fault message.

The device maintenance module of the maintenance computer 206 can receive the message and display the predictive maintenance list of one or more devices in the message on a GUI on a display associated with the maintenance computer 206. The device maintenance module of predictive maintenance computer 206 can allow a maintenance personal or third-party personnel to request the purchase of or obtain one or more devices to be replaced in the commercial passenger vehicle.

When the maintenance personal or the third-party personnel either repairs or obtains and replaces the one or more devices in the commercial passenger vehicle, the maintenance personal or the third-party personnel can indicate via the GUI of the maintenance computer 206 that the one or more devices have been repaired or replaced. The device maintenance module of maintenance computer 206 can generate and send a maintenance record of the repaired or replaced devices located in the commercial passenger vehicle to the ground server 204 that can update its second list. The maintenance record may include an identifier (e.g., serial number or part number) of the one or more devices repaired or newly installed in the commercial passenger vehicle and the date when the repair or installation was performed so that the ground server 204 can continue to analyze the first list of devices to recommend devices from the second list that should be repaired or replaced.

iii. Maintenance Based on Collected or Stored Information about Maintenance Performance The ground server 204 can store in its database 208 a first list of maintenance performed on devices on multiple commercial passenger vehicles. The ground server 204 can also store in its database 208 a second list that includes commercial passenger vehicles identifiers and, for each commercial passenger vehicle, devices that are currently operating within a commercial passenger vehicle. The predictive maintenance module can perform machine learning techniques to determine whether devices in the first list experience maintenance related issues so that the predictive maintenance module can recommend maintenance on the devices in the second list. For example, a machine learning technique can determine that a recent operating system (OS) software update performed on some devices led such device to generate a number of error or fault messages within a pre-determined time window (e.g., 1 month) that is higher than a number or error or fault messages generated by devices with the previous version of the OS software within the pre-determined time window immediately before the installation of the OS software update. Based on this, the machine learning technique can send a message that includes the predictive maintenance list to the maintenance computer 206, where the message identifies the devices whose OS software was updated and recommend that the identified devices be installed with the previous version of the OS software.

The predictive maintenance list that indicates whether to replace or repair a device or a part of a device and is determined by the predictive maintenance module can be sent to and displayed by the maintenance computer 206 to maintenance personnel as described in Sections A.(i) and A.(ii) above. As explained in Sections A.(i) and A.(ii), the maintenance personnel can indicate via the maintenance computer 206 that a maintenance has been performed on a device, whereupon the maintenance computer 206 can generate and send a maintenance record of the repaired or replaced devices located in the commercial passenger vehicle to the ground server 204 that can update its second list.

In some embodiments, for the techniques described in Sections A.(i) to A(iii), the predictive maintenance module of the ground server 204 can also identify the location where parts or devices can be obtained to repair or replace a part or device that is not working. For example, the predictive maintenance list determined by the ground server 204 includes a recommendation to replace a seatback monitor in seatback 34 of a particular airline with a line replaceable unit (LRU) from a centralized storage area at Kansas airport facility. An LRU can be considered a replaceable device on a commercial passenger vehicle. LRUs can include devices such as seatback monitor, seats, ovens, air-conditioning unit, engine, cables, overhead storage compartments, etc., In some embodiments, for the techniques described in Sections A.(i) to A(iii), the predictive maintenance list can be based on the predictive maintenance module determining a pattern of failures for a device after a number of flights when the maintenance crew personnel or third-party personnel indicates via the maintenance computer that they have replaced the failing device with a spare LRU a non-failed LRU. For example, the predictive maintenance module can determine that a device fails after every eight times that an airplane flies to various destinations. The pattern of failure analysis by the predictive maintenance module can be based on past pattern of failures in one or more airplanes, number of a type of LRUs in inventory, and other available collected or stored information of one or more LRUs of the type of the LRUs in inventory and machine learning associated with them or other LRUs (from previous, current, and future flights) with similar, complementary, or conflicting electrical, mechanical, or systems characteristics of any or all the following: number of parts, number of electrical boards, age, failure history, number of flights, date in service, last service date, type or length of flights, total flight time on a current airplane, weather activities, past maintenance records or activities of an airplane, time(s) of flights, number of consecutive day(s) of flight, reasons or any recorded circumstances for flight (cargo drop off, mission to middle east, taxi overseas for repair or maintenance, battery particulars . . . ), number of passengers using the line placement unit, number of replacement of LRUs, or the like.

In some embodiments, for the techniques described in Sections A.(i) to A(iii), the predictive maintenance module can provides product and content optimizations, waste reduction (e.g., time, event, or situational predictions) to others (wholesalers, retail stores, on-line vendors, marketplace participants, or the like) of trends, needs, and purchases of the one or more airlines responsive to the determined predictive maintenance list. For example, the predictive maintenance module can store in a database 208 a third list that includes an inventory and location of parts or devices that are available to the maintenance personnel or third-party personnel to be used to replace a faulty part or device in a commercial passenger vehicle. For example, the third list can indicate where new or functioning devices are located so that the maintenance personnel or third-party personnel can order them via the GUI on the maintenance computer 206 to replace or repair faulty or malfunctioning parts or devices.

In some embodiments, the predictive maintenance module can determine whether additional devices or parts need to be manufactured based on the quantity of parts or devices available on the third list and based on a rate at which maintenance is performed with those parts or devices over a pre-determined time window (e.g., 1 month) as indicated by the first list that is updated based on the maintenance record received from the maintenance computer. In such embodiments, the predictive maintenance module can send a message to another computer associated with a parts or device manufacturer that indicates the total number of parts or devices that are used for maintenance over a pre-determined time window. Such information can assist the parts or device manufacturer to determine whether they need to increase or decrease their manufacturing of the parts or devices used to perform maintenance on commercial passenger vehicles. For example, the predictive maintenance module can determine that a same power supply is being replaced at a rate of 50 power supplies per month across the various commercial passenger vehicles. The predictive maintenance module can send this rate of replacement information to a server associated with the vendor that manufactures the power supply to indicate a recommended rate of manufacturing for the power supply manufacturer.

Advantageously, the systems, apparatus, and methods described in this patent document can adjust, modify, eliminate (e.g., save cost) based on crew maintenance personnel or third-party personnel repairing or replacing responsive to predictive maintenance list. Thus, a commercial passenger vehicle, by following repairing or replacing one or more parts or devices based on the predictive maintenance list can reduce overall costs and improve reliability and/or share cost savings or obtain repair fees in repair or replacement process.

Figure 3A:
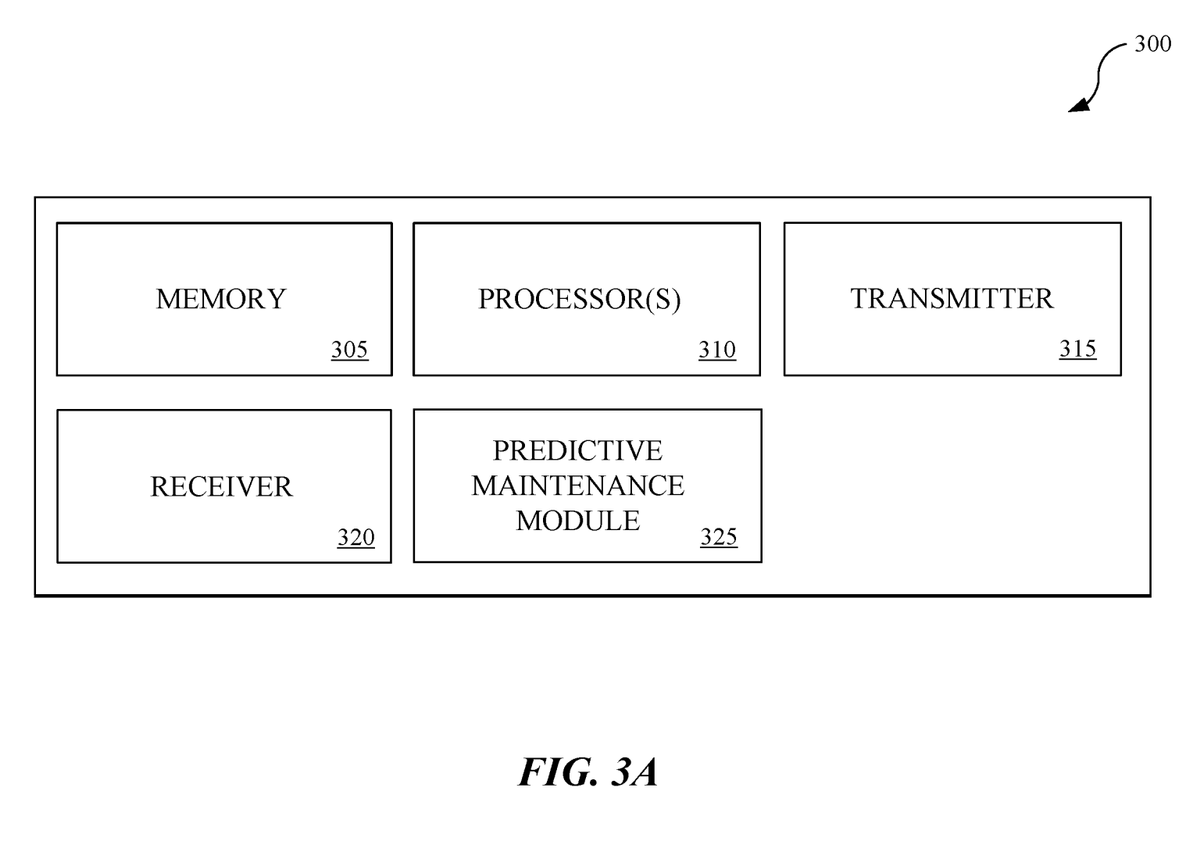
FIG. 3A shows an exemplary block diagram of a ground server that is part of an exemplary operations management system.

FIG. 3A shows an exemplary block diagram of a ground server that is part of an exemplary operations management system. The ground server 300 includes at least one processor 310 and a memory 305 having instructions stored thereupon. The instructions upon execution by the processor 310 configure the ground server 300 to perform the operations described in FIGS. 1, 2, and 4, and to perform the operations described for the predictive maintenance module 325 and a database (118 in FIGS. 1 and 208 in FIG. 2). The instructions upon execution by the processor 310 can also configure the ground server 300 to perform the operations described in the various embodiments described in this patent document. The transmitter 315 transmits or sends information or data to another device (e.g., maintenance computer). The receiver 320 receives information or data transmitted or sent by another device (e.g., maintenance computer).

Figure 3B:
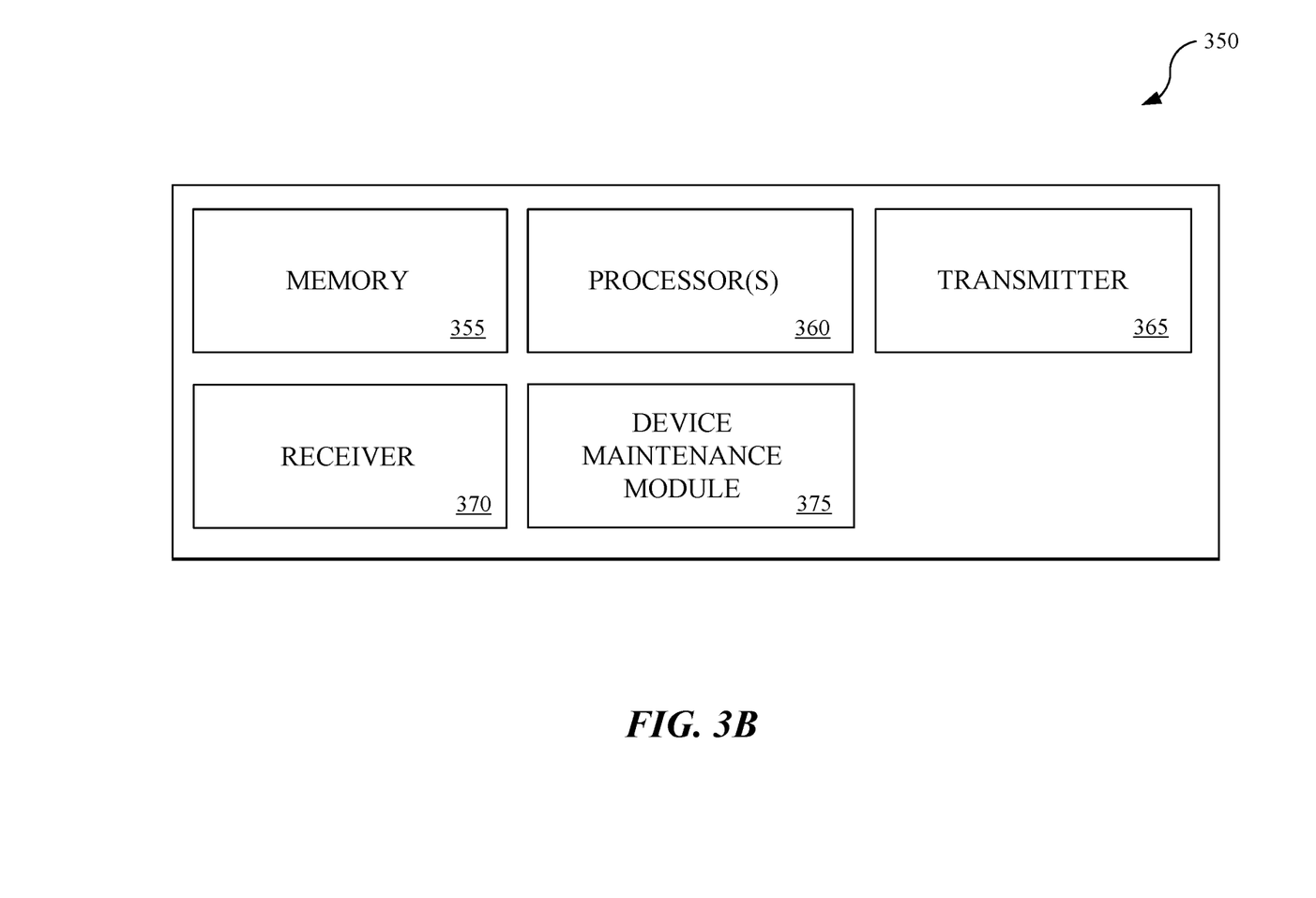
FIG. 3B shows an exemplary block diagram of a maintenance computer that is part of an exemplary operations management system.

FIG. 3B shows an exemplary block diagram of a maintenance computer that is part of an exemplary operations management system. The maintenance computer 350 includes at least one processor 360 and a memory 355 having instructions stored thereupon. The instructions upon execution by the processor 360 configure the maintenance computer 350 to perform the operations described in FIGS. 1, 2, and 4, and to perform the operations described for the device maintenance module 375. The instructions upon execution by the processor 360 can also configure the maintenance computer 350 to perform the operations described in the various embodiments described in this patent document. The transmitter 365 transmits or sends information or data to another device (e.g., ground server). The receiver 370 receives predictive maintenance list or data transmitted or sent by another device (e.g., ground server).

Figure 4:
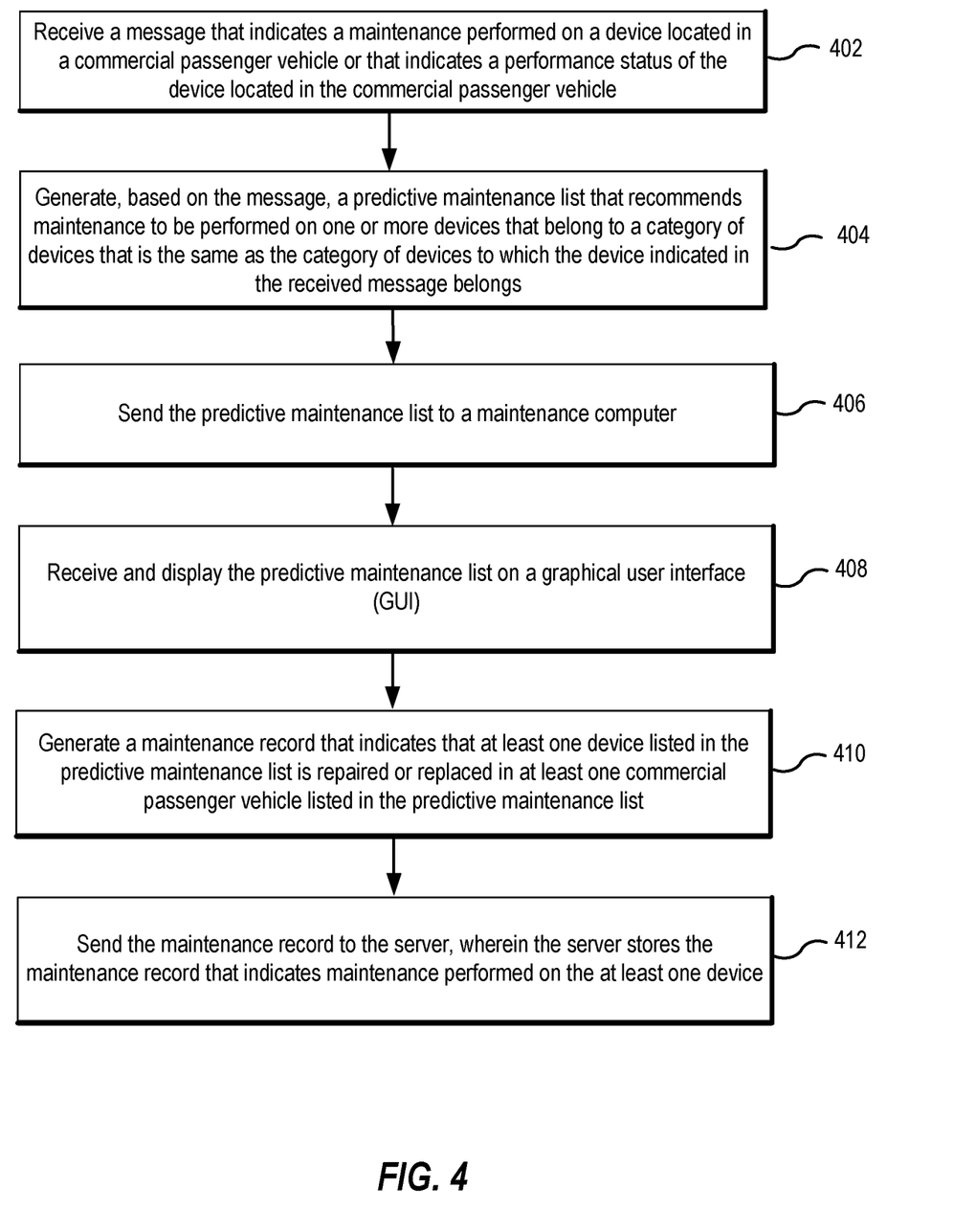
FIG. 4 shows an exemplary flowchart of a method of determining predictive maintenance list by a server of an operations management system.

FIG. 4 shows an exemplary flowchart of a method of determining predictive maintenance list by a server of an operations management system. Operations 402 to 406 can be performed by a predicted management module in a fixed location server, e.g., a ground-based server, that is not located within a commercial passenger vehicle and that is configured to service or services more than one vehicle. Operations 408 to 412 can be performed by a device maintenance module in a maintenance computer that can be located in areas where commercial passenger vehicles can be maintained. In some embodiments, a system can be designed to perform operations 402 to 408.

At the receiving operation 402, the predictive maintenance module receive a message that indicates a maintenance performed on a device located in a commercial passenger vehicle or that indicates a performance status of the device located in the commercial passenger vehicle. At the generating operation 404, the predictive maintenance module generates, based on the message, a predictive maintenance list that recommends maintenance to be performed on one or more devices that belong to a category of devices that is the same as the category of devices to which the device indicated in the received message belongs. The predictive maintenance list is generated to include a first set of identifiers that identify the one or more devices and a second set of identifiers that identify the one or more commercial passenger vehicles on which the one or more devices are located.

At the sending operation 406, the predictive maintenance module sends the predictive maintenance list to a maintenance computer.

At the displaying operation 408, the device maintenance module receives and displays the predictive maintenance list on a graphical user interface (GUI). After the predictive maintenance list is received and displayed, at the generating operation 410, the device maintenance module upon receiving an indication of an action taken generates a maintenance record that indicates that at least one device listed in the predictive maintenance list is repaired or replaced in at least one commercial passenger vehicle listed in the predictive maintenance list. The indication may be received when a maintenance personnel clicks on the GUI to indicate that a maintenance is performed on the at least one device listed in the predictive maintenance list. The generated maintenance record includes an identifier of the at least one device repaired or an identifier of another device that replaced the at least one device, and the generated maintenance record indicates a type of maintenance performed (e.g., repaired device or replaced device). At the sending operation 412, the device maintenance module sends the maintenance record to the predictive maintenance module in the server, where the predictive maintenance module of the server receives and stores the maintenance record that indicates maintenance performed on the at least one device.

In some embodiments, the processor of the predictive maintenance list is generated by determining that the one or more devices are operating within a pre-determined time window from a time associated with a mean-time-between-failure (MTBF) of the device identified in the received message. In some embodiments, the processor of the predictive maintenance list is generated by determining that the one or more devices are operating within a pre-determined time window from a time when the performance status includes an error or fault message generated by the device identified in the received message.

In some embodiments, the predictive maintenance list includes a location where additional devices are stored with which the one or more devices are replaced or repaired. In some embodiments, the predictive maintenance list identifies the one or more devices based on a pattern of failure determined for the device identified in the received message.

In some embodiments, the method of FIG. 4 further includes a predictive maintenance module of a ground server determining, based on the maintenance record, a rate at which the device is replaced or repaired over a pre-determined time window, and sending, to another computer, a second message that includes the rate of replacement or repair of the device. In some embodiments, the message that indicates the performance status of the device is received by the predictive maintenance module of a ground server from the commercial passenger vehicle.

Figure 5:
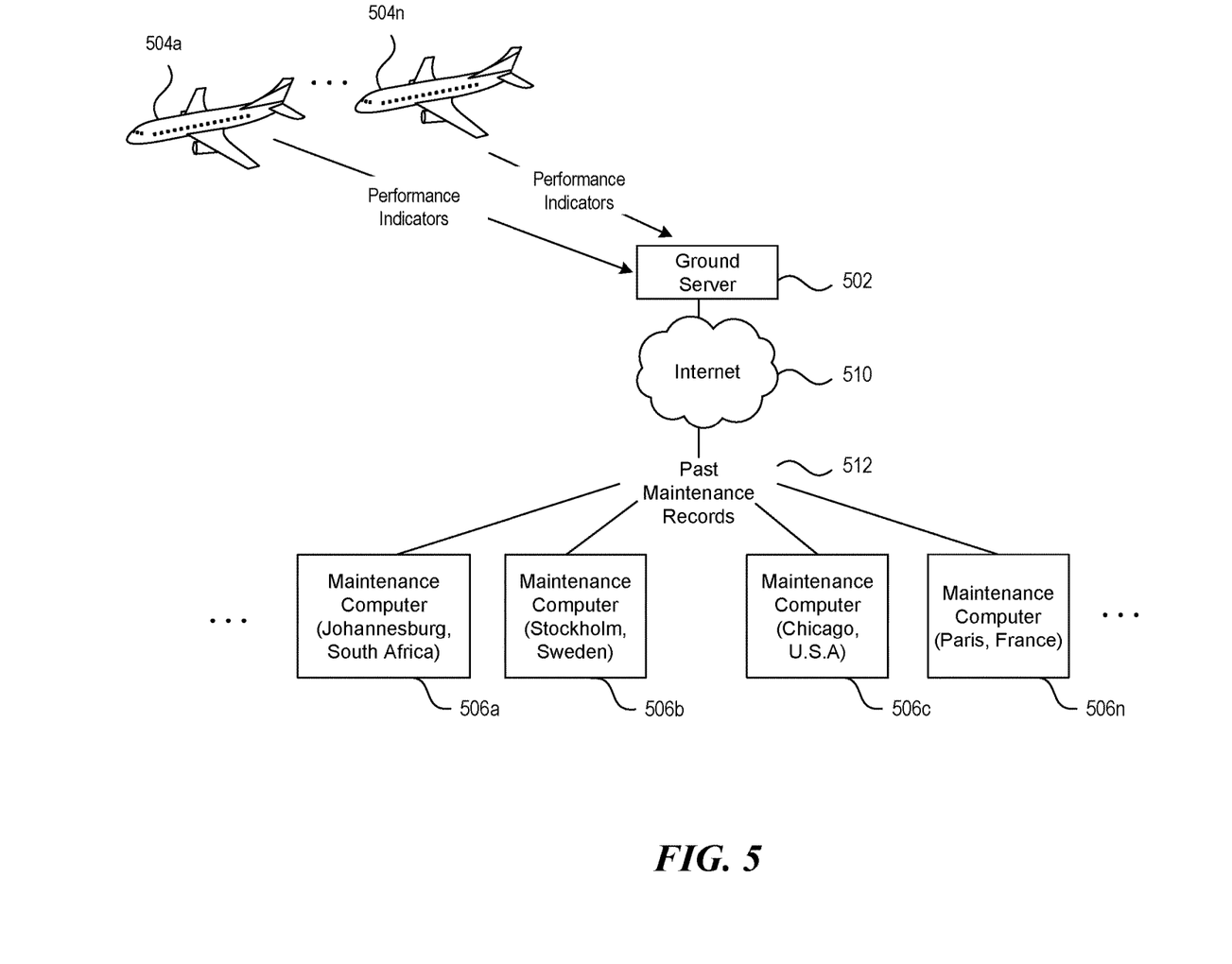
FIG. 5 shows a block diagram of an exemplary operations management system.

FIG. 5 shows a block diagram of an exemplary operations management system. The exemplary operations management system includes a ground server 502 that may be a fixed location server that receives maintenance related information from various sources such as the edge servers on the airplanes 504a-504n and the maintenance computers 506a-506n located at various locations around the world to maintain commercial passenger vehicles. The edge servers on the airplanes 504a-504n that send performance indicators of the devices in the airplanes 504a-504n, and the maintenance computers 506a-506n can send maintenance records that indicate what devices were repaired or replaced and the type of maintenance performed. Based on the performance indicators, the past maintenance records, and any other collected information about the devices located in the commercial passenger vehicles, the ground server 502 can generate a predicted maintenance list to be sent to one or more maintenance computers 506a-506n.

This patent document describes the exemplary operations management system in the context of a commercial passenger vehicle such as an airplane for ease of description. The exemplary operations management system could be used to maintain devices or parts in other types of commercial passenger vehicle such as a train, a ship, or a bus.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this patent document.

What is claimed is:

1. A system for recommending maintenance of devices in commercial passenger vehicles, the system comprising:
   a first server located in a commercial passenger vehicle and comprising a first processor configured to:
      receive error or fault messages from a plurality of devices in the commercial passenger vehicle, wherein the error or fault messages indicate a warning or error condition associated with the plurality of devices;
      store in a database a log of the error or fault messages, wherein the log of the error or fault messages include a table that comprise identifiers of the plurality of devices and a corresponding text that indicate a type of error or fault experienced by the plurality of devices;
      transmit the error or fault messages to a second server via a satellite while the commercial passenger vehicle is traveling to a destination, wherein the second server is located in a fixed location outside the commercial passenger vehicle;
   the second server comprising a second processor configured to:

receive and store the log of the error or fault messages;
generate, by analyzing the log of the error or fault messages, a predictive maintenance list that recommends maintenance to be performed on one or more devices that belong to a category of devices that is the same as the category of devices to which a device from the plurality of devices belongs,
   wherein the predictive maintenance list includes a first set of identifiers that identify the one or more devices and a second set of identifiers that identify one or more commercial passenger vehicles on which the one or more devices are located, and
   wherein the generate the predictive maintenance list is performed by the second processor configured to determine that the one or more devices are operating within a pre-determined time window from a time when an error or fault message generated by the device identified in log of the error or fault messages;
send the predictive maintenance list to a maintenance computer;
the maintenance computer comprising a third processor configured to:
   receive and display the predictive maintenance list on a graphical user interface (GUI); and
   send a maintenance record of a repaired device or a replaced device to the second server that updates accordingly a past predictive maintenance list.

2. The system of claim 1, wherein the maintenance computer comprising the third processor is further configured to;
   after the predictive maintenance list is received and displayed and upon receiving an indication of an action taken, generate the maintenance record that indicates that at least one device listed in the predictive maintenance list is repaired or replaced in at least one commercial passenger vehicle listed in the predictive maintenance list,
   wherein the maintenance record includes an identifier of the at least one device repaired or an identifier of another device that replaced the at least one device, and
   wherein the maintenance record indicates a type of maintenance performed; and
   wherein the second server stores the maintenance record that indicates maintenance performed on the at least one device.

3. The system of claim 1, wherein the second processor of the second server is configured to generate the predictive maintenance list by being configured to:
   determine that the one or more devices are operating within another pre-determined time window from a time associated with a mean-time-between-failure (MTBF) of the device identified in the received message.

4. The system of claim 1, wherein the predictive maintenance list includes a location where additional devices are stored with which the one or more devices are replaced or repaired.

5. The system of claim 1, wherein the predictive maintenance list identifies the one or more devices based on a pattern of failure determined for the device identified in the received message.

6. The system of claim 1, wherein the second processor of the second server is further configured to:
   determine, based on the maintenance record, a rate at which the device is replaced or repaired over another pre-determined time window; and
   send, to another computer, a second message that includes the rate of replacement or repair of the device.

7. A method of recommending maintenance of devices in commercial passenger vehicles, comprising:
   receiving and store a log of the error or fault messages,
      wherein the log of the error or fault messages include a table that comprise identifiers of a plurality of devices that generated error or fault messages in a commercial passenger vehicle and a corresponding text that indicate a type of error or fault experienced by the plurality of devices,
      wherein the error or fault messages indicate a warning or error condition associated with the plurality of devices,
   generating, by analyzing the log of the error or fault messages, a predictive maintenance list that recommends maintenance to be performed on one or more devices that belong to a category of devices that is the same as the category of devices to which a device from the plurality of devices belongs,
      wherein the predictive maintenance list includes a first set of identifiers that identify the one or more devices and a second set of identifiers that identify one or more commercial passenger vehicles on which the one or more devices are located, and
      wherein the generate the predictive maintenance list is performed by determining that the one or more devices are operating within a pre-determined time window from a time when an error or fault message generated by the device identified in log of the error or fault messages; and
   sending the predictive maintenance list to a maintenance computer; and
   receiving, from the maintenance computer, a maintenance record of a repaired device or a replaced device and updating accordingly a past predictive maintenance list.

8. The method of claim 7, further comprising:
   wherein the maintenance record indicates that at least one device listed in the predictive maintenance list is repaired or replaced in at least one commercial passenger vehicle listed in the predictive maintenance list
   wherein the maintenance record includes an identifier of the at least one device repaired or an identifier of another device that replaced the at least one device, and
   wherein the maintenance record indicates a type of maintenance performed.

9. The method of claim 7, wherein the predictive maintenance list is generated by determining that the one or more devices are operating within a pre-determined time window from a time associated with a mean-time-between-failure (MTBF) of the device identified in the received message.

10. The method of claim 7, wherein the predictive maintenance list includes a location where additional devices are stored with which the one or more devices are replaced or repaired.

11. The method of claim 7, wherein the predictive maintenance list identifies the one or more devices based on a pattern of failure determined for the device identified in the received message.

12. The method of claim 7, further comprising:
   determining, based on the maintenance record, a rate at which the device is replaced or repaired over a pre-determined time window; and
   sending, to another computer, a second message that includes the rate of replacement or repair of the device.

13. The method of claim 7, wherein the message that indicates the performance status of the device is received from the commercial passenger vehicle.

14. A apparatus comprising a processor and a memory, the apparatus configured to perform a method of recommending maintenance of devices in commercial passenger vehicles, the method comprising:

receiving and store a log of the error or fault messages,
wherein the log of the error or fault messages include a table that comprise identifiers of a plurality of devices that generated error or fault messages in a commercial passenger vehicle and a corresponding text that indicate a type of error or fault experienced by the plurality of devices,
wherein the error or fault messages indicate a warning or error condition associated with the plurality of devices, generating, by analyzing the log of the error or fault messages, a predictive maintenance list that recommends maintenance to be performed on one or more devices that belong to a category of devices that is the same as the category of devices to which a device from the plurality of devices belongs,
wherein the predictive maintenance list includes a first set of identifiers that identify the one or more devices and a second set of identifiers that identify one or more commercial passenger vehicles on which the one or more devices are located, and
wherein the generate the predictive maintenance list is performed by determining that the one or more devices are operating within a pre-determined time window from a time when an error or fault message generated by the device identified in log of the error or fault messages; and sending the predictive maintenance list to a maintenance computer; and receiving, from the maintenance computer, a maintenance record of a repaired device or a replaced device and updating accordingly a past predictive maintenance list.

15. The apparatus of claim 14, wherein the processor is configured to perform the method that further comprises:

wherein the maintenance record indicates that at least one device listed in the predictive maintenance list is repaired or replaced in at least one commercial passenger vehicle listed in the predictive maintenance list wherein the maintenance record includes an identifier of the at least one device repaired or an identifier of another device that replaced the at least one device, and wherein the maintenance record indicates a type of maintenance performed.

16. The apparatus of claim 14, wherein the predictive maintenance list is generated by determining that the one or more devices are operating within a pre-determined time window from a time associated with a mean-time-between-failure (MTBF) of the device identified in the received message.

17. The apparatus of claim 14, wherein the predictive maintenance list includes a location where additional devices are stored with which the one or more devices are replaced or repaired.

18. The apparatus of claim 14, wherein the predictive maintenance list identifies the one or more devices based on a pattern of failure determined for the device identified in the received message.

19. The apparatus of claim 14, wherein the method further comprises:

determining, based on the maintenance record, a rate at which the device is replaced or repaired over a pre-determined time window; and sending, to another computer, a second message that includes the rate of replacement or repair of the device.

20. The apparatus of claim 14, wherein the message that indicates the performance status of the device is received from the commercial passenger vehicle.

* * * * *